(12) United States Patent
Ting

(10) Patent No.: US 9,030,157 B2
(45) Date of Patent: May 12, 2015

(54) UNIVERSAL CHARGING DETECTION DEVICE AND UNIVERSAL CHARGING DETECTION METHOD

(71) Applicant: Analog Vision Technology Inc., New Taipei (TW)

(72) Inventor: Ming-Chiang Ting, Hsinchu (TW)

(73) Assignee: Green Solutions Technology Co., Ltd., New Taipei (TW)

( * ) Notice: Subject to any disclaimer, the term of this patent is extended or adjusted under 35 U.S.C. 154(b) by 351 days.

(21) Appl. No.: 13/629,630

(22) Filed: Sep. 28, 2012

(65) Prior Publication Data

US 2013/0335007 A1 Dec. 19, 2013

(30) Foreign Application Priority Data

Jun. 13, 2012 (TW) .............................. 101121141 A

(51) Int. Cl.
*H02J 7/00* (2006.01)
(52) U.S. Cl.
CPC ............... *H02J 7/007* (2013.01); *H02J 7/0052* (2013.01); *H02J 2007/0062* (2013.01)
(58) Field of Classification Search
CPC .. H02J 7/007; H02J 7/0052; H02J 2007/0062
See application file for complete search history.

(56) References Cited

U.S. PATENT DOCUMENTS

| 7,170,259 B2 * | 1/2007 | Veselic | 320/114 |
| 7,679,317 B2 * | 3/2010 | Veselic | 320/107 |
| 8,237,414 B1 * | 8/2012 | Li et al. | 320/160 |
| 8,242,742 B2 * | 8/2012 | Kao et al. | 320/114 |
| 8,689,022 B2 * | 4/2014 | Zhou | 713/300 |
| 2008/0303486 A1 * | 12/2008 | Kao et al. | 320/139 |
| 2010/0045258 A1 | 2/2010 | Irie | |
| 2010/0064148 A1 | 3/2010 | Ho et al. | |
| 2010/0201308 A1 | 8/2010 | Lindholm | |
| 2010/0277119 A1 * | 11/2010 | Montague et al. | 320/107 |
| 2012/0210146 A1 | 8/2012 | Lai et al. | |
| 2013/0054983 A1 * | 2/2013 | Zhou | 713/300 |
| 2013/0113414 A1 * | 5/2013 | Chen et al. | 320/107 |
| 2014/0239886 A1 * | 8/2014 | Lalitnuntikul et al. | 320/107 |

FOREIGN PATENT DOCUMENTS

| CN | 101651353 A | 2/2010 |
| CN | 102388520 A | 3/2012 |
| TW | 201035727 A | 10/2010 |

* cited by examiner

*Primary Examiner* — Naum B Levin
(74) *Attorney, Agent, or Firm* — CKC & Partners Co., Ltd.

(57) ABSTRACT

A universal charging detection device and a universal charging detection method are disclosed herein. The universal charging detection device is provided for a charger that can be electrically connected to an electronic device via a universal serial bus (USB). The universal charging detection device includes a voltage output unit, a current sensing unit, a current level detector and a state machine. The voltage output unit is electrically connected to the electronic device. The current sensing unit can convert an output current into a sensing voltage, where the charger outputs the output current to the USB. The current level detector can output a detection signal according to a level of the sensing voltage. The state machine can order that the voltage output unit adjusts a voltage between a first data signal pin (D+) and a second data signal pin (D−) of the USB.

6 Claims, 5 Drawing Sheets

UNIVERSAL CHARGING DETECTION DEVICE AND UNIVERSAL CHARGING DETECTION METHOD

RELATED APPLICATIONS

This application claims priority to Taiwan Application Serial Number 101121141 filed Jun. 13, 2012, which is herein incorporated by reference.

BACKGROUND

1. Technical Field

The present disclosure relates to chargers, and more particularly, universal charging detection devices and universal charging detection methods.

2. Description of Related Art

Charging devices are widely used in various fields. For example, in modern life, charging devices are frequently used in charging consumer electronic devices such as mobile phones, digital cameras, etc. The charging devices are static rectifiers that use power electronic semiconductors to convert the alternating current with fixed voltage and frequency into the direct current. Charging devises have broad prospect in the occasions where rechargeable batteries are used as the operating power or the backup power.

Nowadays, there are many chargers using the universal serial bus (USB) adapter. However, chargers provided by different manufactures or even the same manufacture may have different specifications and are often incompatible to one another, thereby leading to a great number of USB chargers in the market.

In view of the foregoing, there still exist some inconveniences and defects in conventional charging mechanisms that await further improvement. However, those skilled in the art sought vainly for a solution. In order to solve or circumvent above problems and disadvantages, there is an urgent need in the related field to provide a universal charging means.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one or more various aspects, the present disclosure is directed to a universal charging detection device and a universal charging detection method for solving or circumventing aforesaid problems.

According to one embodiment of the present invention, a universal charging detection device is provided for a charger that can be electrically connected to an electronic device via a universal serial bus (USB). The universal charging detection device includes a voltage output unit, a current sensing unit, a current level detector and a state machine. The voltage output unit is electrically connected to the USB, where the USB has a first data signal pin (D+) and a second data signal pin (D−). The current sensing unit converts an output current t into a sensing voltage, where the charger outputs the output current to the USB. The current level detector outputs a detection signal according to a level of the sensing voltage. The state machine orders that the voltage output unit adjusts a voltage between the first data signal pin and the second data signal pin of the USB according to a level of the detection signal.

The current sensing unit includes a comparison unit. The comparison unit compares the sensing voltage with a reference voltage, in which the detection signal is in a first logic level when the sensing voltage is higher than the reference voltage; the detection signal is in a second logic level when the sensing voltage is lower than the reference voltage.

The state machine preloads a plurality of voltage states. When the detection signal is in the second logic level, the state machine periodically use the voltage states one at a time, so as to order that the voltage output unit sets the voltage between the first data signal pin and the second data signal pin according to the voltage states one by one.

Furthermore, when the state machine selects one of the voltage states so that the detection signal is in the first logic level, the state machine locks the one of the voltage states to order that the voltage output unit fixes the voltage between the first data signal pin and the second data signal pin according to the one of the voltage states.

In addition, when the detection signal is maintained in the first logic level over a predetermined period, the state machine locks the one of the voltage states.

According to another embodiment of the present invention, a universal charging detection method is provided for a charger that can be electrically connected to an electronic device via a universal serial bus (USB). The universal charging detection method includes steps of: (a) converting an output current that is outputted to the USB into a sensing voltage, wherein the charger outputs the output current to the USB, and the USB has a first data signal pin and a second data signal pin; (b) outputting a detection signal according to a level of the sensing voltage; and (c) adjusting a voltage between the first data signal pin and the second data signal pin of the USB according to a level of the detection signal.

The step (b) includes: comparing the sensing voltage with a reference voltage to output the detection signal, wherein the detection signal is in a first logic level when the sensing voltage is higher than the reference voltage; the detection signal is in a second logic level when the sensing voltage is lower than the reference voltage.

The step (c) includes: periodically using a plurality of voltage states one at a time when the detection signal is in the second logic level, so as to set the voltage between the first data signal pin and the second data signal pin according to the voltage states one by one.

The step (c) further includes: when selecting one of the voltage states so that the detection signal is in the first logic level, locking the one of the voltage states so as to fix the voltage between the first data signal pin and the second data signal pin according to the one of the voltage states.

In addition, in step (c), when the detection signal is maintained in the first logic level over a predetermined period, the one of the voltage states is locked.

Technical advantages are generally achieved, by embodiments of the present invention, as follows:

1. The universal charging detection device or the universal charging detection method can determine an appropriate charging mode for each electronic device on the basis of a corresponding charging specification, and automatically adapt the voltage to the corresponding charging specification for accomplishing a universal charging means; and
2. The voltage between the first data signal pin (D+) and the second data signal pin (D−) of the USB can be adjusted, so as to conform to respective specifications of various brands of electronic devices.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the folio detailed description read in light of the accompanying drawing, wherein.

DETAILED DESCRIPTION

Figure 1:
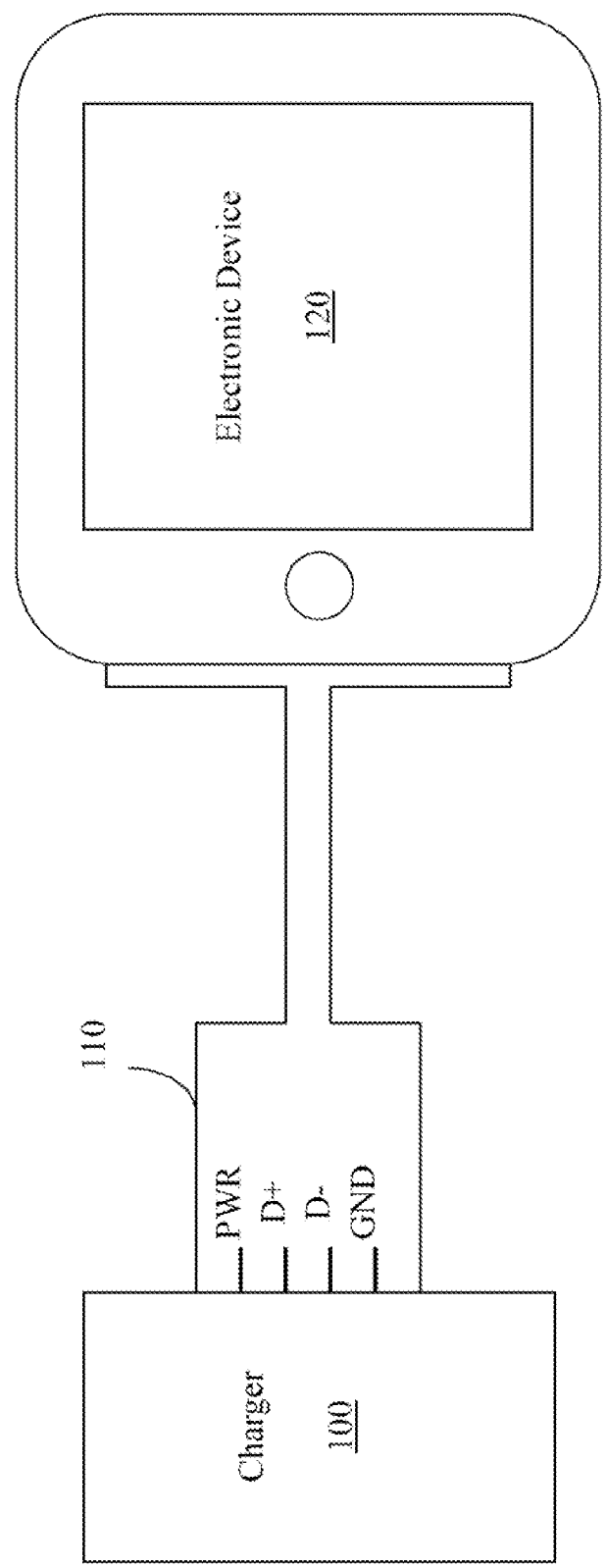
FIG. 1 is a schematic diagram of a charger that is connected to an electronic device according to one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic diagram of a charger 100 that is connected to an electronic device 120 according to one embodiment of the present disclosure. As shown in FIG. 1, the charger 100 can be electrically connected to an electronic device 120 via a universal serial bus (USB) 110. Generally, the USB 110 has a power pin (PWR), a ground pin (GND), a first data signal pin (D+) and a second data signal pin (D−) In this design, the first data signal pin (D+) and the second data signal pin (D−) are used for transmitting data, and the power pin (PWR) and the ground pin (GND) are used for transmitting electric power. When charging, the voltage between the first data signal pin (D+) and the second data signal pin (D−) of the USB 110 must conform to a charging specification of the electronic device 120; if not, the charger 100 outputs weak current to the USB 110.

In one aspect, the present disclosure is directed to a universal charging detection device due to different charging specifications of various brands of electronic devices. This device may be easily inserted into the charger 100 and may be applicable or readily adaptable to all technologies. It should be noted that the universal charging detection device can determine an appropriate charging mode for each electronic device on the basis of a corresponding charging specification, and automatically adapt the voltage to the corresponding charging specification for accomplishing a universal charging means. Herewith the motor control device is illustrated by reference to the following description considered in FIGS. 2-5.

Figure 2:
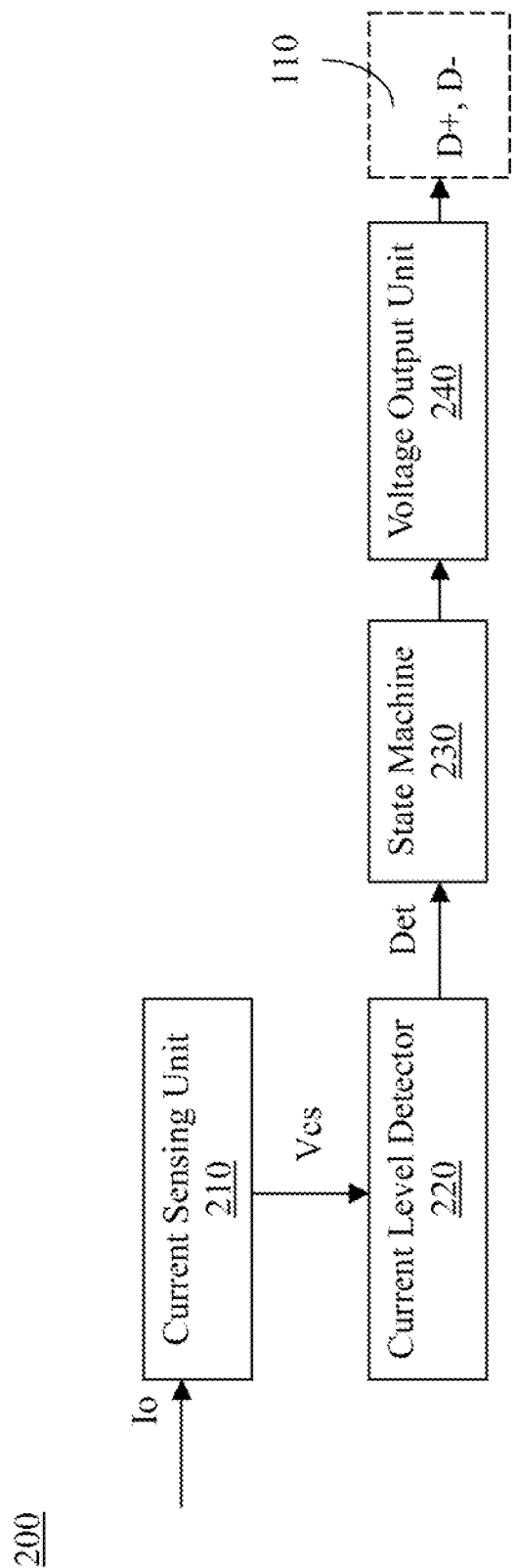
FIG. 2 is a block diagram of a universal charging detection device according to one embodiment of the present disclosure.

FIG. 2 is a block diagram of a universal charging detection device 200 according to one embodiment of the present disclosure. As shown in FIG. 2, the universal charging detection device 200 includes a current sensing unit 210, a current level detector 220, a state machine 230 and a voltage output unit 240. The current sensing unit 210 is electrically connected to the current level detector 220. The current level detector 220 is electrically connected to the state machine 230. The state machine 230 is electrically connected to the voltage output unit 240. The voltage output unit 240 is electrically connected to the USB 110 as shown in FIG. 1.

The current sensing unit 210 converts an output current (Io) that is outputted to the USB 110 into a sensing voltage (Vcs). When the voltage between the first data signal pin (D+) and the second data signal pin (D−) of the USB 110 does not conform to the charging specification of the electronic device 120, the output current (Io) is very low, and therefore the level of the sensing voltage (Vcs) is relatively low. On the contrary, when the voltage between the first data signal pin (D+) and the second data signal pin (D−) of the USB 110 conforms to the charging specification of the electronic device 120, the output current (Io) is relatively high, and therefore the level of the sensing voltage (Vcs) is relatively high.

The current level detector 220 outputs a detection signal (Det) according to a level of the sensing voltage (Vcs). The current level detector 220 orders that the voltage output unit 240 adjusts a voltage between the first data signal pin (D+) and the second data signal pin (D−) of the USB 110 according to a level of the detection signal (Det). In this way, the voltage between the first data signal pin (D+) and the second data signal pin (D−) of the USB 110 can be adjusted so as to conform to respective specifications of various brands of electronic devices, and thus, universal charging means is accomplished.

Figure 3:
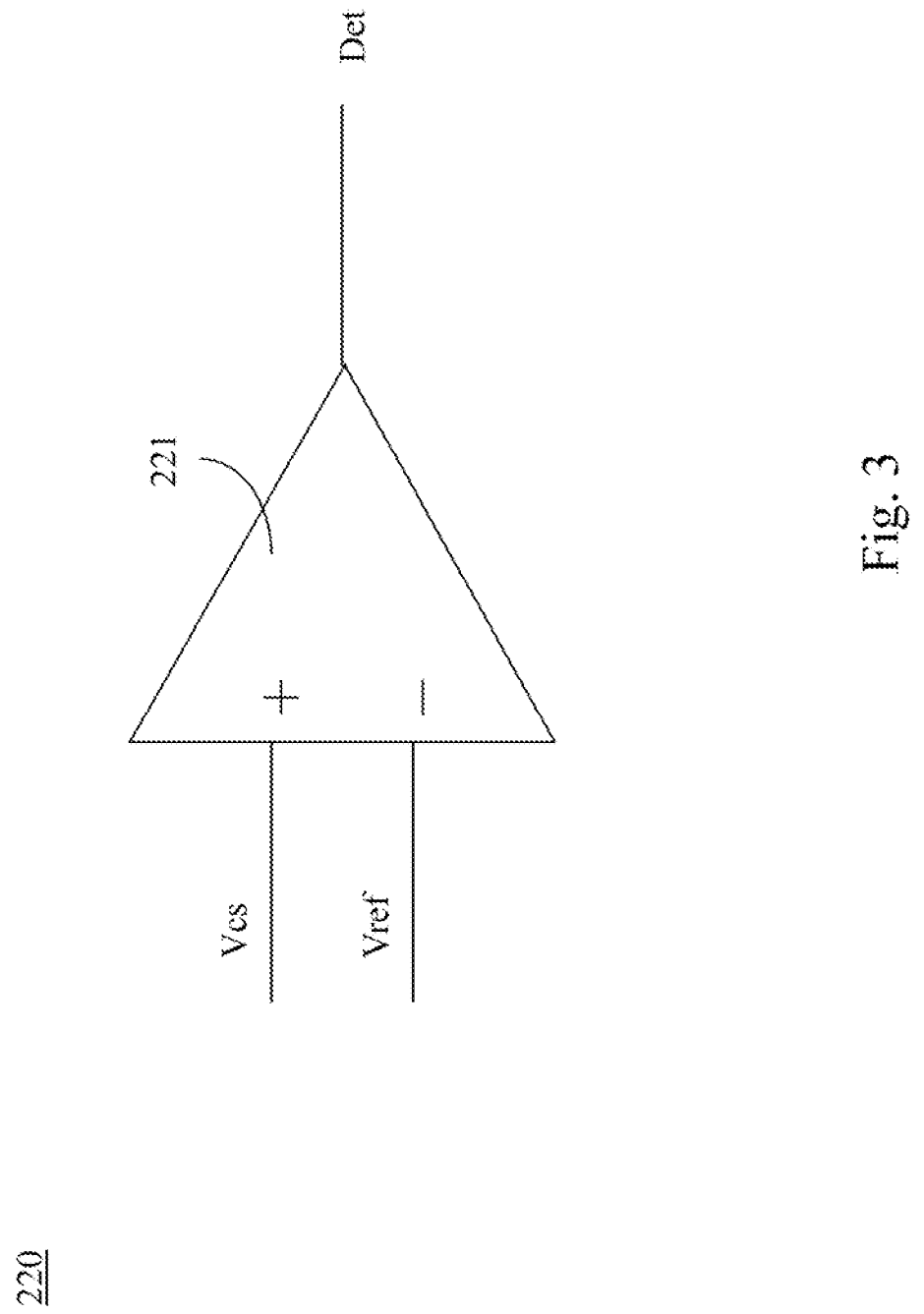
FIG. 3 is a schematic diagram of a current level detector according to one embodiment of the present disclosure.

For a more complete understanding of the current level detector 220, and the advantages thereof, refer to FIG. 3. FIG. 3 is a schematic diagram of a current level detector 220 according to one embodiment of the present disclosure. As shown in FIG. 3, the current level detector 220 includes a comparison unit 221. The comparison unit 221 compares the sensing voltage (Vcs) with a reference voltage (Vref) to output the detection signal (Det). When the sensing voltage (Vcs) is higher than the reference voltage (Vref), the detection signal is in a logic high level (i.e., "1"), which represents that the voltage between the first data signal pin (D+) and the second data signal pin (D−) of the USB 110 conforms to the charging specification of the electronic device 120. When the sensing voltage (Vcs) is lower than the reference voltage (Vref), the detection signal is in a logic low level (i.e., "0"), which represents that the voltage between the first data signal pin (D+) and the second data signal pin (D−) of the USB 110 does not conform to the charging specification of the electronic device 120. In practice, those with ordinary skill in the art may flexibly choose the value of the reference voltage (Vref) depending on the desired application.

Figure 4:
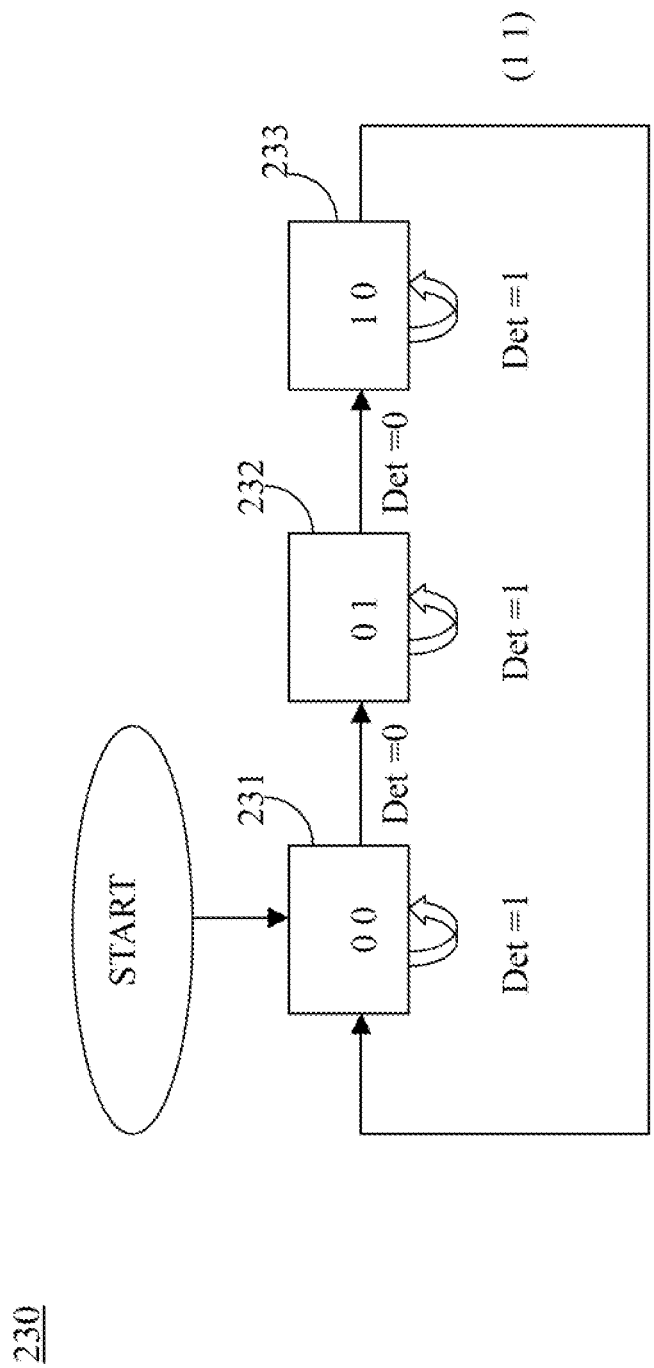
FIG. 4 is a schematic diagram illustrating a state machine in operation according to one embodiment of the present disclosure.

Turning to FIG. 4, which is a schematic diagram illustrating the state machine 230 in operation according to one embodiment of the present disclosure. As shown in FIG. 4, the state machine 230 preloads a plurality of voltage states 231, 232, and 233 corresponding to respective specifications of various brands of electronic devices. When the detection signal (Det) is in the logic low level, which represents that the voltage between the first data signal pin (D+) and the second data signal pin (D−) of the USB 110 does not conform to the charging specification of the electronic device 120, the state machine 230 periodically use the voltage states 231, 232, and 233 one at a time, so as to order that the voltage output unit 240 sets the voltage between the first data signal pin (D+) and the second data signal pin (D−) according to the voltage states one by one until the voltage between the first data signal pin (D+) and the second data signal pin (D−) of the USB 110 conforms to the charging specification of the electronic device 120.

In one embodiment, when the detection signal (Det) is maintained in the logic high level over a predetermined period, the state machine 230 locks aforesaid one of the voltage states, so as to avoid an erroneous determination of voltage level, where the erroneous determination results from noise or a surge. In practice, the state machine 230 can counts time duration by means of an internal or external timer, and those with ordinary skill in the art may flexibly choose the value of the predetermined period depending on the desired application.

Figure 5:
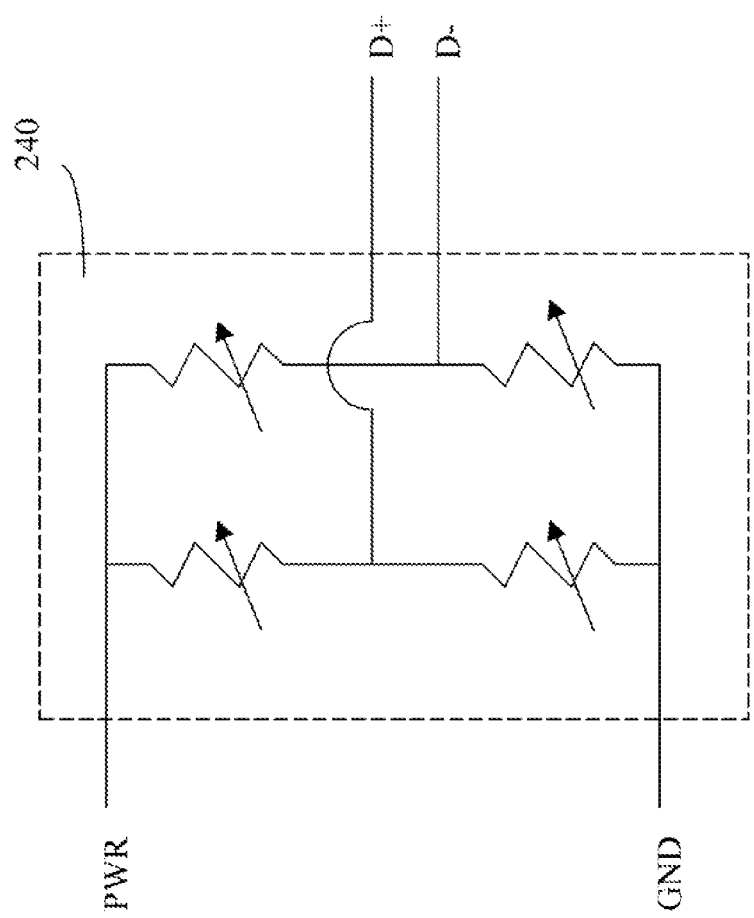
FIG. 5 is an equivalent-circuit diagram of a voltage output unit according to one embodiment of the present disclosure.

FIG. 5 is an equivalent-circuit diagram of a voltage output unit 240 according to one embodiment of the present disclosure. In FIG. 5, the voltage between the first data signal pin (D+) and the second data signal pin (D−) of the USB can be adjusted, so as to conform to respective specifications of various brands of electronic devices.

The current level detector 220, the state machine 230 and the voltage output unit 240 may be hardware, software, and/or firmware. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

As to the current level detector 220, the state machine 230 and the voltage output unit 240, those with ordinary skill in the art will appreciate that the above denomination is provided for illustrative purposes only to further explain applications of these elements and are not meant to limit the number of elements and hardware configuration in any manner. In one or more embodiments, one element may be divided into various elements, or the function of one element may be integrated into another element. Those with ordinary skill in the art could make numerous alterations to the disclosed embodiments without departing from the spirit or scope of this invention.

In one aspect, the present disclosure is directed to a universal charging detection method provided for a charger 100 that can be electrically connected to the electronic device 120 via the USB 110. The universal charging detection method includes steps of: (a) converting an output current to the USB 110 into a sensing voltage (Vcs), wherein the charger 100 outputs the output current to the USB 110, and the USB 110 has a first data signal pin (D+) and a second data signal pin (D−); (b) outputting a detection signal (Det) according to a level of the sensing voltage; and (c) adjusting a voltage between the first data signal pin (D+) and the second data signal pin (D−) of the USB 110 according to a level of the detection signal (Det). In this way, the voltage between the first data signal pin (D+) and the second data signal pin (D−) of the USB 110 can be adjusted, so as to conform to respective specifications of various brands of electronic devices and thus a universal charging means is accomplished.

In the universal charging detection method, the steps are not recited in the sequence in which the steps are performed. That is, unless the sequence of the steps is expressly indicated, the sequence of the steps is interchangeable, and all or part of the steps may be simultaneously, partially simultaneously, or sequentially performed. It should be noted that those implements to perform the steps in the motor control method are disclosed in above embodiments and, thus, are not repeated herein.

The step (b) include comparing the sensing voltage (Vcs) with the reference voltage (Vref) to output the detection signal, wherein the detection signal is in a logic high level (i.e., "1") when the sensing voltage (Vcs) is higher than the reference voltage (Vref); the detection signal is in a logic low level (i.e., "0") when the sensing voltage (yes) is lower than the reference voltage (Vref).

The step (c) includes: periodically using a plurality of different voltage states 231-233 (reference to FIG. 4) one at a time when the detection signal (Det) is in the logic low level, so as to set the voltage between the first data signal pin (D+) and the second data signal pin (D−) according to the voltage states one by one.

The step (c) further includes: when selecting one of the voltage states 231-233 so that the detection signal (Det) is in the logic high level, locking the one of the voltage states, so as to fix the voltage between the first data signal pin (D+) and the second data signal pin (D−) according to the one of the voltage states. In this way, the charger 100 can charge the electronic device 120 in normal.

In addition, in step (c), when the detection signal (Det) is maintained in the logic high level over a predetermined period, the one of the voltage states is locked, so as to avoid an erroneous determination of voltage level, where the erroneous determination results from noise or a surge.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A universal charging detection device for a charger that is utilized to be electrically connected to an electronic device via a universal serial bus (USB), the universal charging detection device comprising:
    a voltage output unit is electrically connected to the USB, the USB having a first data signal pin and a second data signal pin;
    a current sensing unit for converting an output current into a sensing voltage, wherein the charger outputs the output current to the USB;
    a current level detector comprises a comparison unit for comparing the sensing voltage with a reference voltage, wherein the detection signal is in a first logic level when the sensing voltage is higher than the reference voltage; the detection signal is in a second logic level when the sensing voltage is lower than the reference voltage; and
    a state machine preloads a plurality voltage states; when the state machine selects one of the voltage states so that the detection signal is maintained in the first logic level over a predetermined period, the state machine locks the one of the voltage states for ordering that the voltage output unit adjusts a voltage between the first data signal pin and the second data signal pin of the USB.

2. The universal charging detection device of claim 1, wherein when the detection signal is in the second logic level, the state machine periodically use the voltage states one at a time, so as to order that the voltage output unit sets the voltage between the first data signal pin and the second data signal pin according to the voltage states one by one.

3. The universal charging detection device of claim 2, wherein when the state machine selects one of the voltage states so that the detection signal is in the first logic level, the state machine locks the one of the voltage states to order that the voltage output unit fixes the voltage between the first data signal pin and the second data signal pin according to the one of the voltage states.

4. A universal charging detection method for a charger that is utilized to be electrically connected to an electronic device via a universal serial bus (USB), the universal charging detection method comprising:
    (a) converting an output current that is outputted to the USB into a sensing voltage, wherein the USB has a first data signal pin and a second data signal pin;
    (b) comparing the sensing voltage with a reference voltage to output the detection signal, wherein the detection signal is in a first logic level when the sensing voltage is higher than the reference voltage; the detection signal is in a second logic level when the sensing voltage is lower than the reference voltage; and
    (c) preloading a plurality of voltage states; when selecting one of the voltage states so that the detection signal is maintained in the first logic level over a predetermined period, the one of the voltage states is locked for adjusting a voltage between the first data signal pin and the second data signal pin of the USB.

5. The universal charging detection method of claim 4, wherein the step (c) comprises:
    periodically using the different voltage states one at a time when the detection signal is in the second logic level, so as to set the voltage between the first data signal pin and the second data signal pin according to the voltage states one by one.

6. The universal charging detection method of claim 5, wherein the step (c) further comprises:
    when selecting one of the voltage states so that the detection signal is in the first logic level, locking the one of the voltage states so as to fix the voltage between the first data signal pin and the second data signal pin according to the one of the voltage states.

* * * * *